(12) United States Patent
Dominique et al.

(10) Patent No.: US 7,929,495 B2
(45) Date of Patent: Apr. 19, 2011

(54) METHODS AND APPARATUSES FOR POWER REDUCTION IN TRANSCEIVERS

(75) Inventors: Francis Dominique, Rockaway, NJ (US); Hongwei Kong, Denville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 640 days.

(21) Appl. No.: 11/790,990

(22) Filed: Apr. 30, 2007

(65) Prior Publication Data

US 2008/0268918 A1 Oct. 30, 2008

(51) Int. Cl.
*H04W 4/00* (2009.01)
(52) U.S. Cl. .......................... 370/329; 370/535
(58) Field of Classification Search .................. None
See application file for complete search history.

(56) References Cited

U.S. PATENT DOCUMENTS

| 6,868,075 | B1 * | 3/2005 | Narvinger et al. ............ 370/335 |
| 2005/0157759 | A1 | 7/2005 | Ohno et al. |
| 2007/0070926 | A1 * | 3/2007 | Bachl et al. .................. 370/310 |

OTHER PUBLICATIONS

Quentin H. Spencer, "A Hybrid Approach to Spatial Multiplexing in Multiuser MIMO Downlinks". *J on Wireless Comm. and Networking*, vol. 2, pp. 236-247 (2004).
"Universal Mobile Telecommunications System (UMTS); Multiplexing and channel coding". *ETSI TS* 125 212 V5. 10.0 (Jun. 2005).

* cited by examiner

*Primary Examiner* — Erika A Gary
(74) *Attorney, Agent, or Firm* — Harness, Dickey & Pierce

(57) ABSTRACT

In a method for power reduction at a receiver, a first radio frame is processed to recover transmitted data based on transport format information. The transport format information is determined based on a combination of transport format information associated with a plurality of received radio frames rather than a single frame. In another method for power reduction at a receiver, whether transport format information associated with a first radio frame is different from transport format information associated with a second radio frame is determined. The transport channel data is then processed based on the determination. The first radio frame is received prior to the second radio frame, and the transport format information indicates a transport format for transport channel data received in the first and second radio frames.

19 Claims, 7 Drawing Sheets

METHODS AND APPARATUSES FOR POWER REDUCTION IN TRANSCEIVERS

BACKGROUND OF THE INVENTION

A cellular communications network typically includes a variety of communication nodes coupled by wireless or wired connections and accessed through different types of communications channels. Each of the communication nodes includes a protocol stack that processes data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) employ a dedicated traffic channel in the uplink (e.g., a communication flow between a mobile station (MS) or User Equipment (UE), hereinafter referred to as a user, and a base station (BS) or Node B. The dedicated physical channel may include a data part (e.g., a dedicated physical data channel (DPDCH) in accordance with UMTS Release 4/5 and 6 protocols) and a control part (e.g., a dedicated physical control channel (DPCCH) in accordance with UMTS Release 4/5 and 6 protocols).

FIG. 1 illustrates a conventional wireless communication system 100 operating in accordance with UMTS protocols. Referring to FIG. 1, the wireless communication system 100 may include a number of Node Bs such as Node Bs 120, 122 and 124, each serving the communication needs of users 110 in their respective coverage area. The Node Bs are connected to an RNC such as RNCs 130 and 132, and the RNCs are connected to a MSC/SGSN 140. The RNC handles certain call and data handling functions, such as, autonomously managing handovers without involving MSCs and SGSNs. The MSC/SGSN 140 handles routing calls and/or data to other elements (e.g., RNCs 130/132 and Node Bs 120/122/124) in the network or to an external network. Further illustrated in FIG. 1 are interfaces Uu, Iub, Iur and Iub between these elements.

FIG. 2 illustrates an example of a frame structure for a UMTS uplink dedicated physical channel. As shown, each frame 200 may have a length of, for example, 10 milliseconds (ms) and may be partitioned into 15 slots 205. Each slot 205 may have a length of 2560 chips, which corresponds to one power-control period, and may have a duration of 2/3 ms.

The uplink dedicated physical channel includes a DPDCH 240 and a DPCCH 220. The DPCCH 220 and the DPDCH 240 may be code multiplexed. The uplink DPDCH 240 carries information (e.g., voice, data, video, etc.) transmitted from users 110 to NodeBs 120/122/124.

The DPCCH 220 includes 15 slots per radio frame, where 1 radio frame is 10 ms in duration. The DPCCH carries control information, such as, a pilot signal 221, transmit power control information (e.g., transmit power control (TPC) bits) 222, a transport format combination indicator (TFCI) value 223 and feedback information (FBI) 224 (which may or may not be used). The TFCI 223 informs the Node B 120/122/124 of the transport format information (e.g., voice and/or data packets sizes, coding types, etc.) transmitted by users 110. For example, TFCIs indicate the composition of a transport channel (TrCh) among a plurality of transport channels carried by the corresponding DPDCH.

FIG. 3 illustrates a conventional uplink transmitter and receiver.

Referring to FIG. 3, well-known DPCCH frames used in determining channel estimates are modulated at a BPSK Modulator 205, and the modulated frames are orthogonally spread at an orthogonal spreading unit 210. The output from the orthogonal spreading unit 210 is gain adjusted at gain unit 215 and output to combiner 220.

At transport channel processing block 202, data associated with upper layer transport channels (TrChs) is processed into DPDCH frames. That is, for example, the transport channels are mapped onto the DPDCH. A conventional manner in which this is performed will be discussed in more detail with regard to FIG. 4.

FIG. 4 is flow diagram of a well-known conventional uplink Transport Channel Multiplexing and Coding process in 3GPP UMTS described, for example, in 3GPP TS 25.212 version 5.10.0 Release 5 (Universal Mobile Telecommunications System (UMTS); Multiplexing and channel coding (FDD)). Because such a flow diagram is well-known in the art, only certain portions will be discussed for the sake of brevity. The flow diagram in FIG. 4 illustrates processes performed at the transport channel processing block 202 of FIG. 3.

Referring to FIGS. 3 and 4, at the transport channel processing block 202, each upper layer transport channel undergoes a number of processes including coding, interleaving, etc., and several transport channels are multiplexed into form a "Coded Composite Transport Channel (CCTrCH)." Control information is added and the overall signal is mapped onto the DPDCH.

As is well-known, each transport channel is associated with a Transfer Format (TF), which depends on the type of data (e.g., video, speech, Internet, etc.) and the associated transfer rate. Each set of multiplexed transport channels or CCTrCh corresponds to a specific combination of transport formats known as a Transport Format Combination (TFC). Information regarding the TFC for a set of multiplexed transport channels and how the transport channels are assembled into the DPDCH is sent from transmitter to receiver in the above-discussed TFCI.

Referring back to FIG. 3, the DPDCH frames generated by the transport channel processing block 202 are binary phase shift keying (BPSK) modulated at BPSK modulator unit 216, and orthogonally spread at the orthogonal spreading unit 222. The spread modulated frames are gain adjusted by gain unit 240. The gain adjusted frames are output to the combiner 220.

The outputs of each of the gain units 215 and 240 are combined at combiner 220, and the resultant signal is output to scrambling and shaping filter 225. The resultant signal is scrambled and filtered by scrambling and shaping filter 225. The filtered signal is sent to the receiver 500 via propagation channel 330 (e.g., over the air).

At the receiver 500, the transmitted signal is received over the propagation channel 330, and input to DPDCH physical channel processing block 555 and DPCCH processing block 504.

Within the DPDCH processing block 555, DPDCH soft-symbol generation block 502 processes the received signal over a radio frame within the current transmission time interval (TTI) TTI_N to recover a DPDCH soft-symbol sequence. The well-known TTI is a wireless network parameter referring to the length of an independently decodable transmission on the radio link. The TTI is related to the size of data blocks passed from the higher network layers to the radio link layer. Each DPDCH soft-symbol sequence represents an estimate of a corresponding DPDCH frame output from the transport channel processing block 202 in the transmitter 200. In one example, the DPDCH soft-symbol generation block 502 processes the received signal over the current radio frame N to partially recover DPDCH soft-symbols up to a given spreading factor interval (e.g., a minimum allowed spreading factor interval), hereinafter referred to as data frame DN. Operations performed at the DPDCH soft-symbol generation block 502 include matched-filtering, descrambling, a first DPDCH despreading and a first DPDCH demodulation operation, each of which are well-known in the art, and thus, will only be described briefly herein for the sake of brevity. At the DPDCH soft-symbol generation block 502, the first de-spreading and demodulation operations do not require TFCI information to generate data frames.

The DPDCH soft-symbol generation block 502 outputs the recovered data frame DN to a frame buffer 506. The frame buffer 506 buffers the data frame DN for a length of time equal to the length of the current radio frame N and outputs the buffered data frame DN to the despreading and TrCh demultiplexing block 508.

While generating and buffering the data frame DN, the DPCCH processing block 504 processes the received signal to generate a sequence of control information soft-symbols (e.g., TFCI soft symbols, herein referred to as a control frame CN) corresponding to the data frame DN. The control frame CN is decoded to recover control information TFCI_N received over the current radio frame N. The control information TFCI_N may include, for example, transfer format information or a TFCI word for corresponding data frame DN. Operations performed at the DPCCH processing block 504 include matched-filtering, descrambling, a DPCCH despreading and a DPCCH demodulation operation, each of which are well-known in the art, and thus, will not be described any further herein for the sake of brevity.

The recovered TFCI word TFCI_N may be output to the despreading and TrCh demultiplexing block 508.

Still referring to FIG. 3, the despreading and Trch demultiplexing block 508 despreads the data frame DN, and demultiplexes the set of transport channels TrCh0, TrCh1, . . . TrChn within the data frame DN using the TFCI word TFCI_N from the DPCCH processing block 504 to generate a transport channel frame TrChF0-TrChFn associated with each of the transport channels TrCh0-TrChn. Because the despreading and transport channel demultiplexing performed at the despreading and TrCh demultiplexing block 508 is well-known in the art, a further discussion will be omitted for the sake of brevity.

The plurality of transport channel frames TrChF0-TrChFn may be output to a corresponding one of a plurality of rate de-matching blocks 510_0, 510_1, . . . , 510_n. Through well-known rate de-matching, each of the plurality of rate de-matching blocks 510_0-510_n recovers bits (or transport channel data) transmitted in a corresponding one of transport channel frames TrCHF0-TrChFn using the TFCI word TFCI_N from the DPCCH processing block 504. Each of the plurality of rate de-matching blocks 510_0-510_n outputs transport channel data for a corresponding one of the transport channel frames TrChF0-TrChFn to a corresponding one of a plurality of transport channel processing blocks 512_0, 512_1, . . . 512_n. Each of the plurality of transport channel processing blocks 512_0-512_n processes the received transport channel data to recover the transmitted data or data stream. As is well-known, transport channel processing includes, for example, decoding, CRC check, etc.

Conventionally, a TFCI word is transmitted each radio frame, but remains unchanged over the ° FI for all transport channels multiplexed on the DPDCH. Conventional TFCI processing at the DPCCH processing block 504 attempts to recover TFCIs each radio frame, and use the recovered TFCI word to process the DPDCH. However, conventional TFCI processing does not check whether TFCI words in consecutive radio frames (e.g., N, N+1, . . . N+m) within a TTI are the same or identical, before recovering the TFCI word in each radio frame. Because the TFCI word is detected individually frame-by-frame, more power is required to recover TFCI bits with higher reliability. Moreover, because no error checks on successful TFCIs within the TTI are performed, transport channel processing is performed regardless and power consumption is unnecessarily increased.

SUMMARY OF THE INVENTION

Example embodiments are directed to methods for power reduction at wireless receivers. At least one example embodiment, improves transfer format detection performance without increasing transmit power by combining TFCIs from the plurality of radio frames within the TTI, which results in an improvement of the Signal to Noise ratio (SNR). At least one other example embodiment detects transfer format errors earlier such that the receiver can terminate transport channel processing early to reduce power consumption in the receiver processing.

At least one example embodiment provides a method for receiving transmitted data at a receiver in a wireless network. The method may include processing, at the receiver, a first radio frame to recover transmitted data based on transport format information. The transport format information may be a combination of individual transport format information associated with a plurality of received radio frames.

At least one other example embodiment provides another method for receiving transmitted data at a receiver in a wireless network. According to at least this example embodiment, the receiver may determine whether first transport format information associated with a first radio frame is different from second transport format information associated with a second radio frame, and selectively process the transport channel data based on the determination. The first radio frame may be received prior to the second radio frame, and the first and second transport format information may be indicative of a transport format for transport channel data received in the first and second radio frames.

At least one other example embodiment provides a receiver for receiving transmitted data in a wireless network. The receiver may include a processing unit. The processing unit may be configured to process a first radio frame to recover transmitted data based on transport format information. The transport format information may be a combination of individual transport format information associated with a plurality of received radio frames.

At least one other example embodiment provides a receiver for receiving transmitted data in a wireless network. The receiver may include a transport format decision unit. The transport format decision unit may be configured to determine whether first transport format information associated with a first radio frame is different from second transport format information associated with a second radio frame. The first radio frame may be received prior to the second radio frame, and the first and second transport format information may be indicative of a transport format for transport channel data received in the first and second radio frames. The receiver may selectively process the transport channel data based on the determination made by the transport format decision unit.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

As discussed above with regard to FIG. 1, the UMTS environment may include at least users 110. Users 110 may transmit UMTS Release 4/5/6 signals to a serving NodeB 120/122/124 simultaneously over dedicated channels (e.g., DPDCHs and DPCCH), respectively. As discussed above, these dedicated physical channels may be transmitted over respective propagation channels, each of which may include multiple propagation paths.

Figure 5:
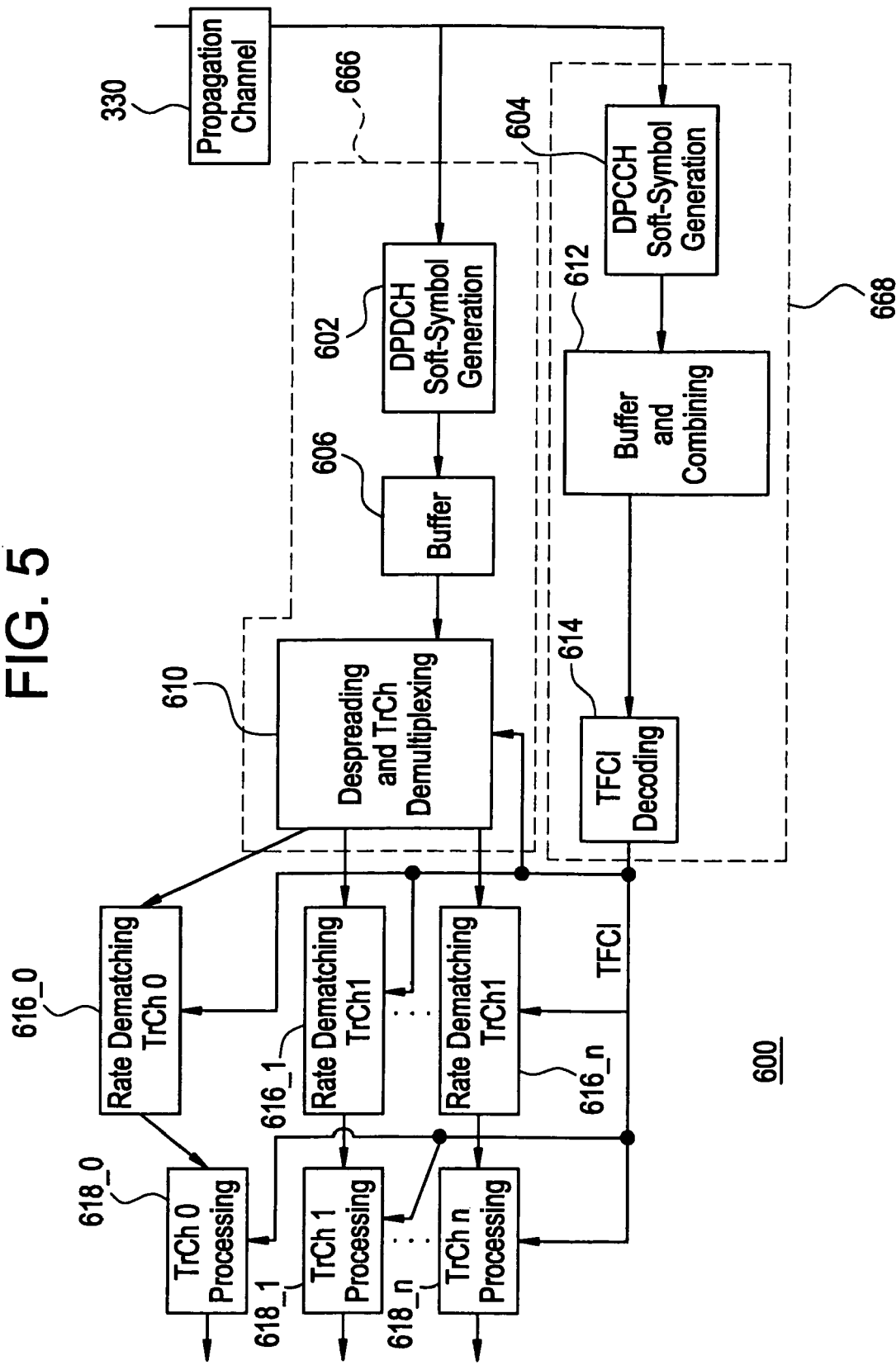
FIG. 5 illustrates a uplink receiver according to an example embodiment.

FIG. 5 illustrates a receiver according to an example embodiment. The receiver in FIG. 5 may be located at, for example, any or all of the NodeBs 120/122/124 shown in FIG. 1. For exemplary purposes example embodiments of the present invention will be discussed with regard to the conventional wireless system of FIG. 1 and the transmitter 200 of FIG. 3; however, it will be understood that example embodiments may be implemented in conjunction with any suitable wireless telecommunications network (e.g., UMTS, CDMA2000, etc.).

Referring to FIG. 5, at receiver 600, the transmitted signal is received over the propagation channel 330. The received signal is input to DPDCH processing block 666 and DPCCH processing block 668.

Within the DPDCH processing block 666, the DPDCH soft-symbol generation block 602 processes the received signal over a current radio frame N within the current transmission time interval (TTI) TTI_N to recover a DPDCH soft-symbol sequence. Each DPDCH soft-symbol sequence represents an estimate of a corresponding DPDCH frame output from the transport channel processing block 202 in FIG. 3. In one example, the DPDCH soft-symbol generation block process the received signal over the current radio frame N to partially recover DPDCH soft-symbols up to a given spreading factor interval (e.g., a minimum allowed spreading factor interval). The generated DPDCH soft-symbol sequence will be referred to herein as a data frame DN. As discussed above with regard to FIG. 3, processes for doing so are well-known in the art, and thus, will only be described briefly herein for the sake of brevity.

The DPDCH soft-symbol generation block 602 outputs the data frame DN to a buffer 606, and continues processing subsequent radio frames N+1, N+2, ..., N+m in the current transmission time interval (TTI) TTI_N.

The buffer 606 buffers the data frame DN for a length equal to the length of the current TTI TTI_N. According to at least some example embodiments, the buffer 606 may have a size sufficient to simultaneously store all data frames (e.g., DN, DN+1, ..., DN+m) in the current TTI TTI_N. The length of the TTI may be known at both the transmitter and receiver. According to at least one example embodiment, the buffer 606 may be a well-known first-in first-out (FIFO) buffer or any other suitable buffer or buffer memory. After the duration of the TTI TTI_N has lapsed, the data frame DN may be output to the despreading and TrCh demultiplexing block 610.

Referring still to FIG. 5, while generating and buffering the data frame DN, the DPCCH processing block 668 processes the received signal over the current radio frame N to generate transfer format information or a TFCI word for use in recovering the transmitted data.

Within the DPCCH processing block 668, a DPCCH soft-symbol generation block 604 processes the received signal over the current radio frame N to generate a sequence of control information soft-symbols, herein referred to as a control frame CN. The control information soft-symbols may be TFCI soft-symbols.

The DPCCH soft-symbol generation block 604 may output the control frame CN to buffer and combining block 612, and continue processing the received signal over subsequent radio frames N+1, N+2, ... N+m to generate control frames CN+1, CN+2, ..., CN+m. The control frames CN+1, CN+2, ..., CN+m may also be output to the buffer and combining block 612. In one example, the DPCCH soft-symbol generation block 604 processes the received signal over each radio frame within the current TTI TTI_N to generate a control frame corresponding to each data frame generated by the DPDCH processing block 602. Alternatively, however, the DPCCH soft-symbol generation block 604 may continue processing the received signal to generate a threshold number of control frames. The control frame threshold may be set by a human operator or a computer based on experimental results, empirical data, power constraints at the receiver, etc.

Referring still to FIG. 5, at the buffer and combining block 612, the received control frames CN–CN+m may be buffered and combined to generate resultant control information soft-symbols (or a resultant control frame) for the current TTI TTI_N. That is, for example, the transfer format or TFCI soft-symbols corresponding to each data frame DN, DN+1, . . . DN+m may be buffered at the buffer and combining block 612 for a first time interval T, and subsequently combined to generate resultant TFCI soft-symbols for the current TTI TTI_N. The time interval T may be equal to a length of time necessary to generate TFCI soft-symbols associated with a desired number of radio frames. In one example, the desired number of radio frames may be all radio frames within the TTI. The buffer and combining block 612 may include a buffer (not shown). The buffer may be any well-known buffer or buffer memory.

In one example, control frames CN–CN+m may be combined by combining soft-symbols corresponding to the same coding bits for each respective radio frame N, N+1, ..., N+m. The resultant control frame may be output to the TFCI decoding block 614.

At the TFCI decoding block 614, the resultant control frame may be decoded to recover a transmitted control information (e.g., transfer format information or TFCI word). The TFCI decoding block 614 outputs the recovered TFCI word to the despreading and TrCh demultiplexing block 610, rate dematching blocks 616_0, 616_1, . . . , 616_n and transmission channel processing blocks 618_0, 618_1, . . . , 618_n.

As discussed above, the data frame DN may be output from the buffer 606 to the despreading and TrCh demultiplexing block 610.

The despreading and TrCh demultiplexing block 610 despreads the data frame DN, and demultiplexes the set of transport channels TrCh0, TrCh1, . . . , TrChn within the data frame DN using the received TFCI word to generate a transport channel frame TrChF0, TrChF1, . . . , TrChn associated with each transport channel TrCh0-TrChn). Because the despreading and transport channel demultiplexing performed at the second despreading and TrCh demultiplexing block 610 is well-known in the art, a further discussion will be omitted for the sake of brevity.

Each of the plurality of transport channel frames TrChF0-TrChFn may be output to a respective one of a plurality of rate de-matching blocks 616_0, 616_1, . . . , 616_n. Through well-known rate dematching, each of the plurality of rate de-matching blocks 616_0, -616_n recovers bits (or transport channel data) included in a corresponding one of transport channel frames TrChF0-TrChFn using the TFCI word recovered based on the resultant control frame. Each of the plurality of rate de-matching blocks 616_0-616_n outputs transport channel data for a corresponding one of the transport channels TrCh0, TrCh1, . . . TrChn to a corresponding one of a plurality of transport channel processing blocks 618_0, 618_1, . . . , 618_n. Each of the plurality of transport channel processing blocks 618_0-618_n processes the received transport channel data to recover the transmitted data or data stream for the current radio frame N. As is well-known, transport channel processing includes, for example, decoding, CRC check, etc.

The recovered data streams associated with each transport channel are then output for further processing and/or data recovery. Because such further processing and data recovery is well-known a detailed description of which will be omitted for the sake of brevity.

Figure 6:
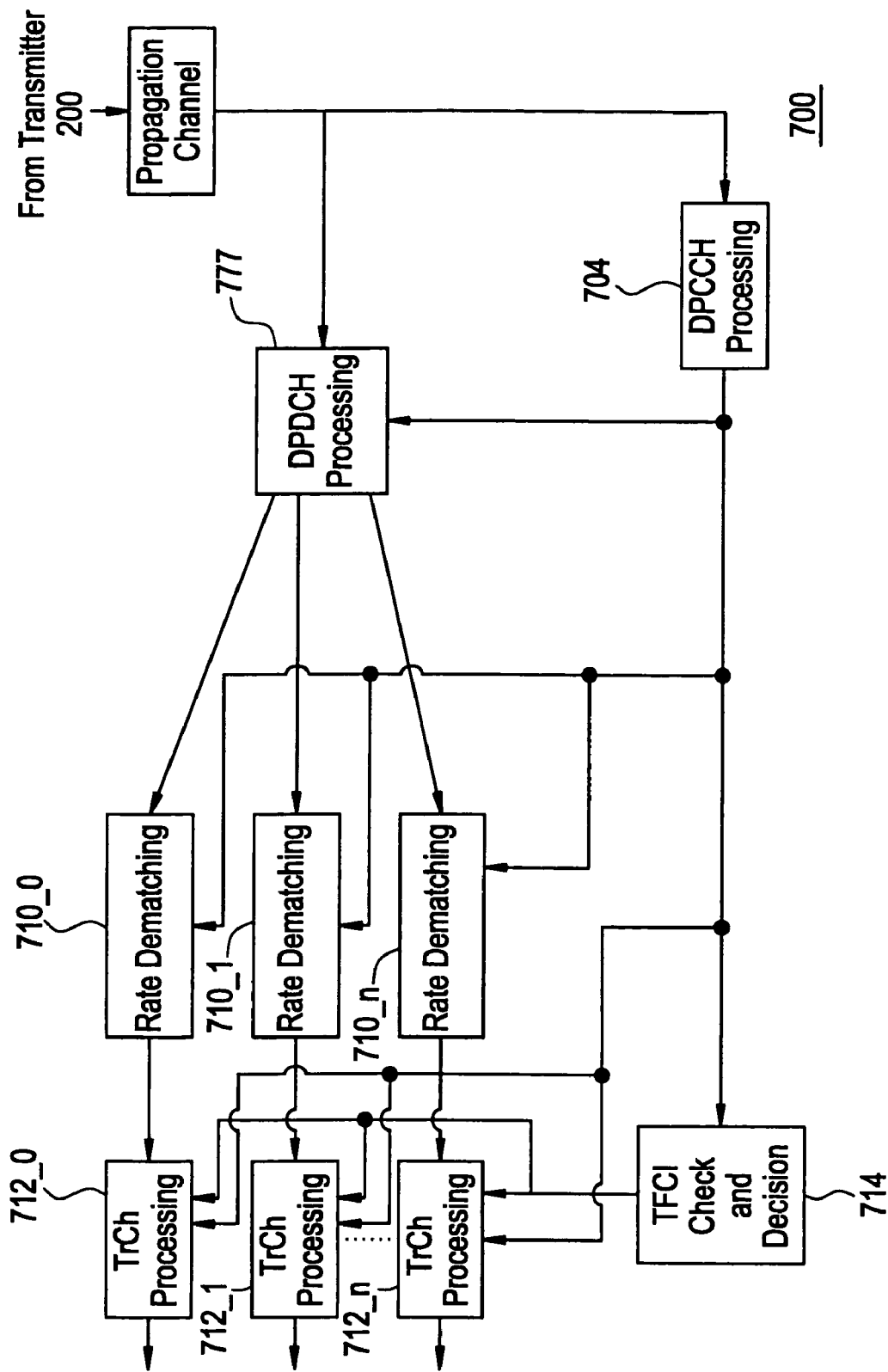
FIG. 6 illustrates a uplink receiver according to another example embodiment.

FIG. 6 illustrates a receiver according to another example embodiment. Because control information (e.g., TFCI words) for radio frames within the current TTI (e.g., a minimum TI) are the same, if the actual decoded control information within at least the minimum TTI are not the same, a CRC check performed during transport channel processing may fail. Consequently, if different TFCI words within a current TTI are detected, the transport channel processing may be disabled or terminated. This may conserve processing power required for decoding, CRC check, etc.

Figure 1:
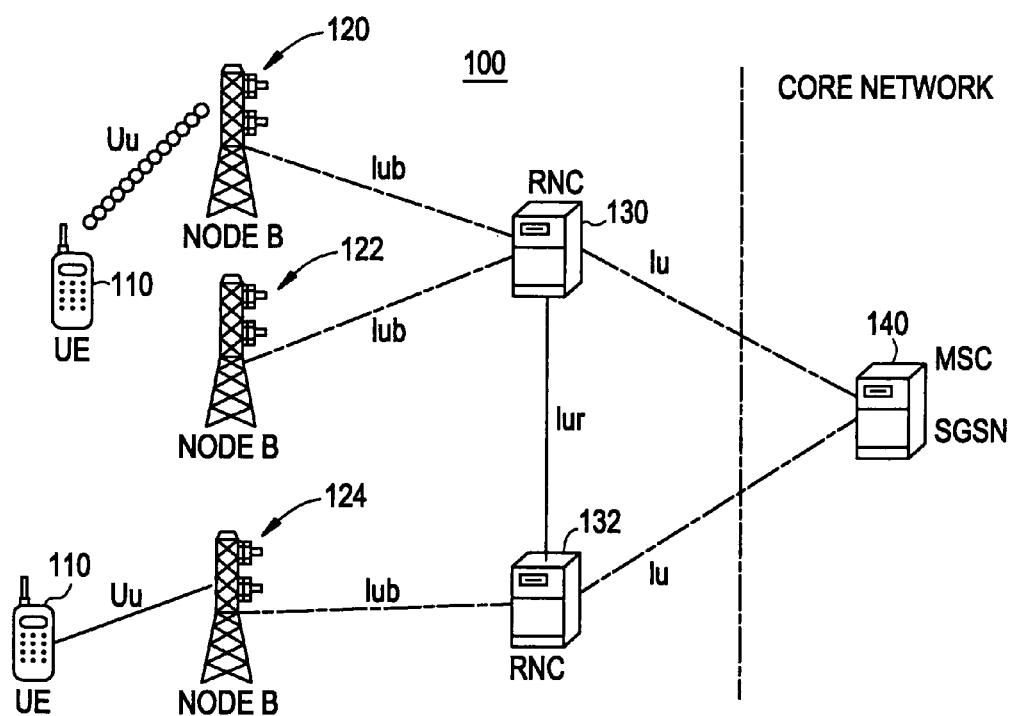
FIG. 1 illustrates a conventional wireless communication system operating in accordance with UMTS protocols.
Figure 2:
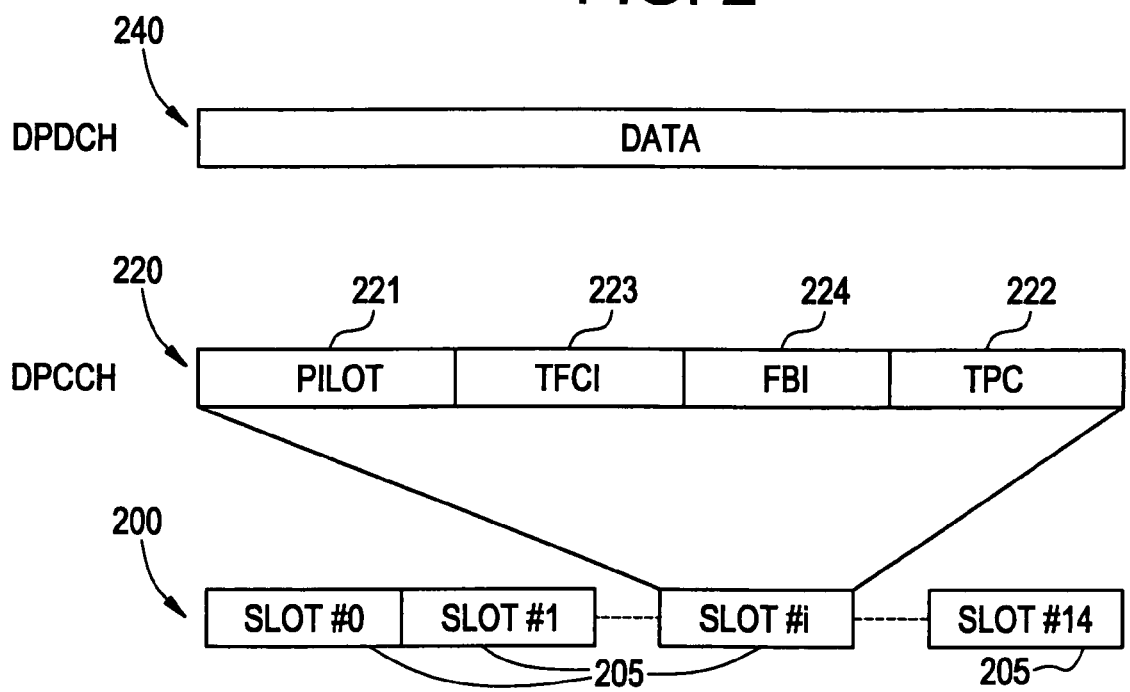
FIG. 2 illustrates an example of a conventional of uplink dedicated physical channel frame structure.

The receiver in FIG. 6 may be located at, for example, any or all of the NodeBs 120/122/124 shown in FIG. 1. For exemplary purposes example embodiments of the present invention will be discussed with regard to the conventional wireless system of FIG. 1 and the transmitter 200 of FIG. 3; however, it will be understood that example embodiments may be implemented in conjunction with any suitable wireless telecommunications network (e.g., UMTS, CDMA2000, etc.).

Figure 3:
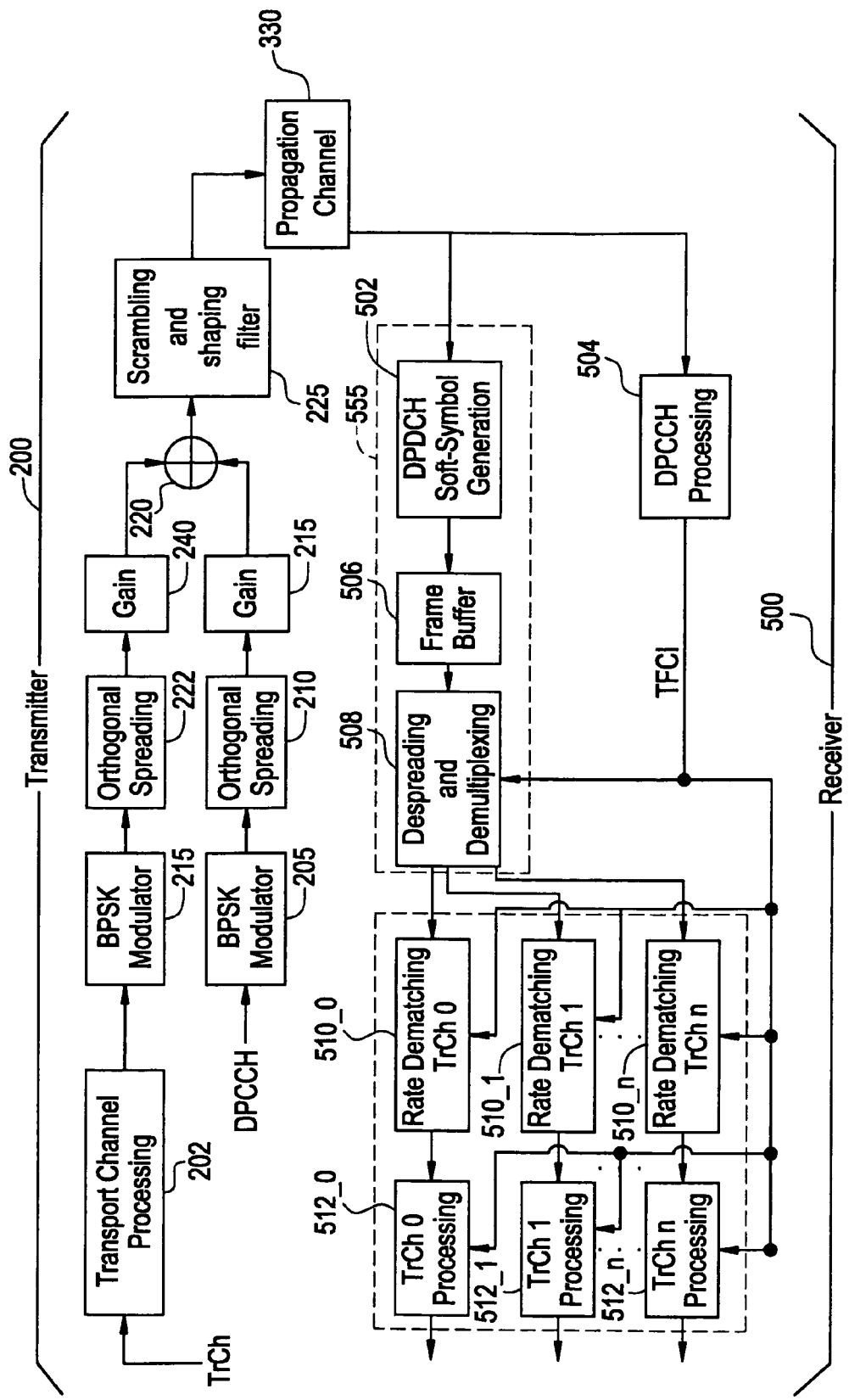
FIG. 3 illustrates a conventional UMTS uplink transmitter and receiver.
Figure 4:
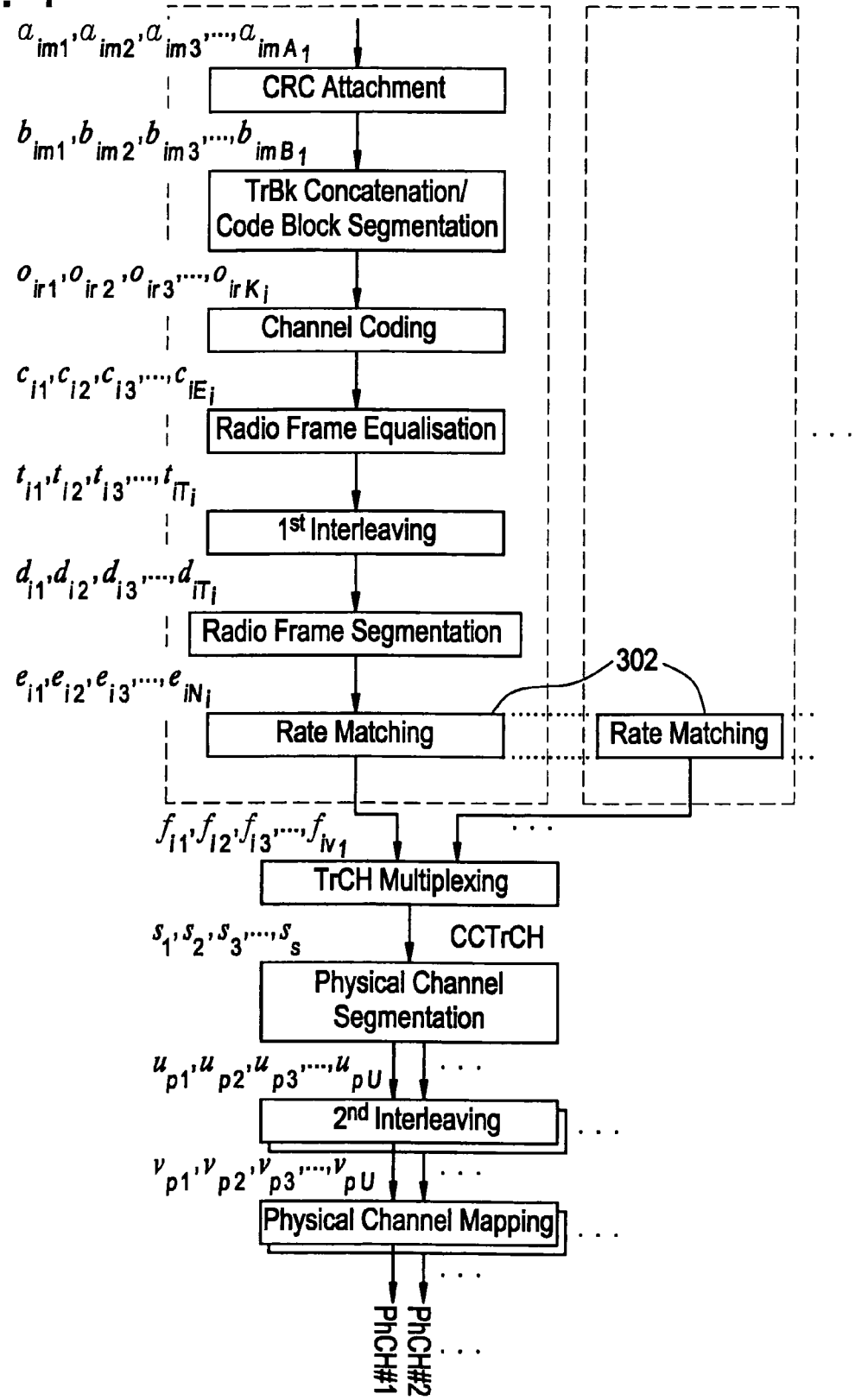
FIG. 4 is flow diagram of a conventional down-link Transport Channel Multiplexing and Coding process

Referring to FIG. 6, the receiver 700 may be similar to the receiver 500 of FIG. 3, but may further include a TFCI check and decision block 714.

Referring to FIG. 6, the received signal is input to DPDCH processing block 777 and DPCCH processing block 704. The DPDCH processing block 777 may function in the same manner as the DPDCH processing block 555 described above with regard to FIG. 3 and may output to each of the a plurality of transport channel frames TrChF0-TrChFn to a corresponding one of a plurality of rate dematching blocks 710_0-710_n.

The DPCCH processing block 704 may be similar to the DPCCH processing block of FIG. 3, except that recovered control information (transfer format information or TFCI word for each radio frame) may be output to a TFCI check and decision block 714 in addition to outputting the recovered TFCI words for each radio frame to the despreading and TrCh demultiplexing block 708, rate dematching blocks 710_0-710_n and TrCh processing blocks 712_0-712_n.

The plurality of rate de-matching blocks 710_0, 710_0-710_n may operate in the same manner as the plurality of rate de-matching blocks 510_0-510_n, and output transport channel data for each of transport channels TrCh0-TrChn to a corresponding one of a plurality of transport channel processing blocks 712_0-712_n.

The transport channel processing blocks 712_0-712_n may selectively process the received transport channel data based on a transport channel processing indicator TF_DIS generated by the TFCI check and decision block 714. That is, for example, each of the plurality of transport channel processing blocks 712_0-712_n, other than the transport channel processing blocks disabled by the TFCI check and decision block 714, processes transport channel data to recover the transmitted data or data stream. As is well-known, transport channel processing includes, for example, decoding, CRC check, etc.

The recovered data streams associated with each transport channel are then output for further processing and/or data recovery. Because such further processing and data recovery is well-known, a detailed description thereof will be omitted for the sake of brevity.

The TFCI check and decision block 714, and processes performed thereby, will be discussed in more detail below.

According to at least one example embodiment, the TFCI check and decision block 714 determines whether to disable transport channel processing at one or more of the transport channel processing blocks 712_0-712_n based on control information associated with at least two radio frames within a current TTI. That is, for example, based on a comparison between control information associated with a previous radio frame and control information associated with a current radio frame, the TFCI check and decision block 714 may generate a transport channel processing indicator TF_DIS to selectively disable processing at one or more of the transport channel processing blocks 712_0-712_n. The process performed at the TFCI check and decision block 714 will be described in more detail with regard to FIG. 7.

Figure 7:
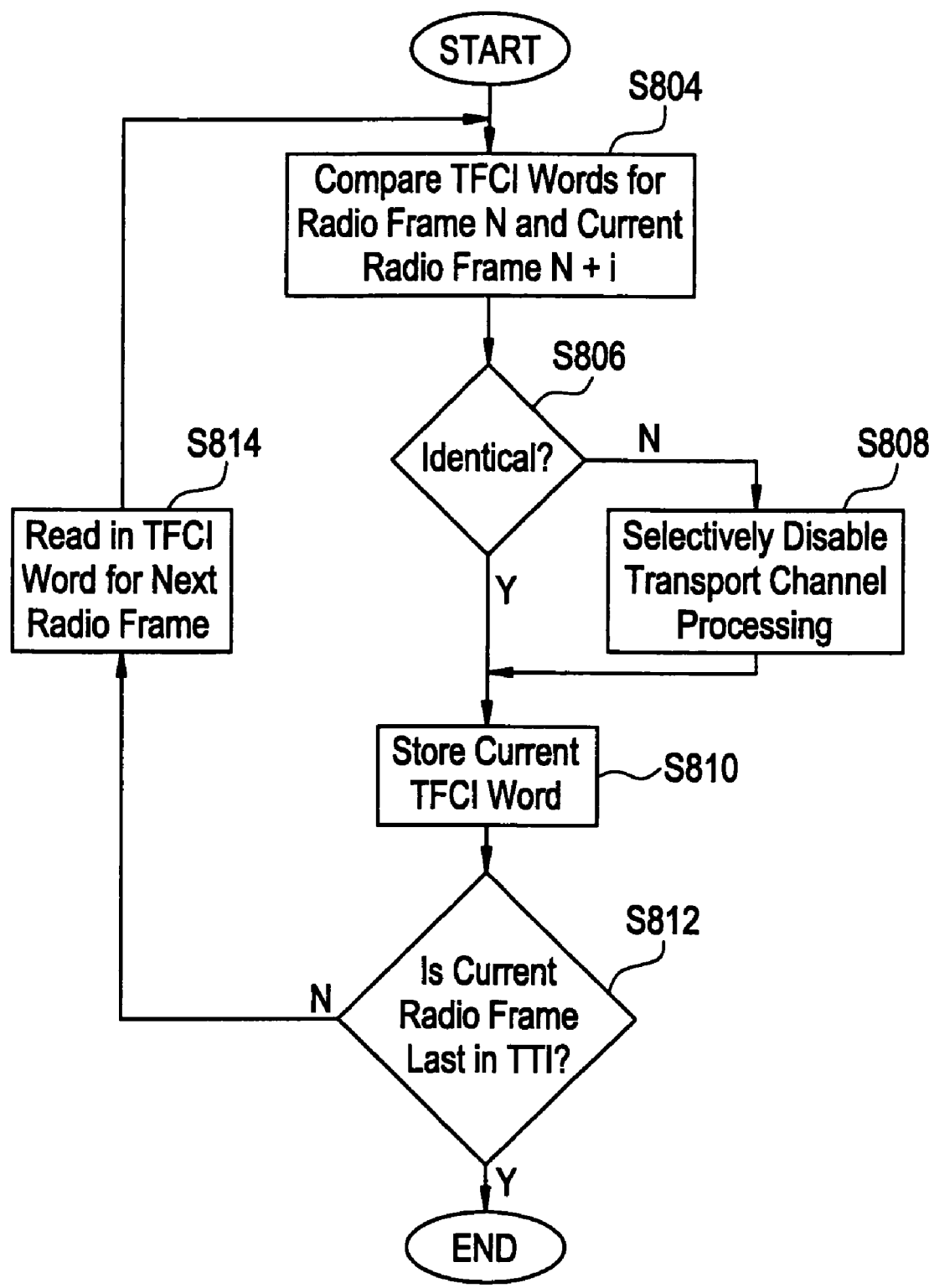
FIG. 7 is a flow chart illustrating a method for power reduction at a receiver according to an example embodiment.

FIG. 7 illustrates a method according to an example embodiment. The method of FIG. 7 may be performed at the TFCI check and decision block 714.

Referring to FIG. 7, after having received and stored control information (e.g., a TFCI word) TFCI_N associated with a first radio frame N in the current TTI and upon receipt of subsequent control information TFCI_N+i associated with a next radio frame N+i, the TFCI check and decision block 714 compares the stored or previous control information TFCI_N with the current control information TFCI_N+i.

At step S806, the TFCI check and decision block 714 determines whether the stored or previous control information TFCI_N and the current control information TFCI_N+i are the same. If the control information TFCI_N and TFCI_N+i are the same, the TFCI check and decision block 714 stores the current control information TFCI_N+i in a memory (not shown), at step S810. At step S812, the TFCI check and decision block 714 determines whether the current radio frame N+i is the last radio frame in the current TTI. Methods for doing so are well-known in the art, and thus, a detailed discussion will be omitted for the sake of brevity. If the current radio frame N+i is the last radio frame in the current TTI, the process terminates.

Returning to step S812, if the current radio frame N+i is not the last radio frame in the current TTI, the TFCI check and decision block 714 reads in control information for next radio frame (e.g., from a buffer or the like, not shown). The process then returns to step S804 and repeats.

Returning to step S806, if control information TFCI_N and TFCI_N+i are different, the TFCI check and decision block 714 may retain the previous control information TFCI_N, discard the control information TFCI_N+i and disable transport channel processing for transport channels in which a change in the control information causes a change in transport format at step S808. To do so, the TFCI check and decision block 714 may output the transport channel processing indicator TF_DIS in the form of a binary signal (e.g., a '0' or '1') to disable the desired transport channel processing block. The process may then proceed to step S810 and continue as described above.

A change in the TFCI may indicate a change in the transport format, but TFCIs in the radio frames comprising a given TTI are the same. A change in these individual TFCIs that comprise a given TTI may be caused by, for example, noise, interference and/or fading in the propagation channel. Because the TFCIs may be protected by a robust error correction scheme, any change in the decoded TFCIs for a TTI is a sufficient indicator of relatively poor signal quality and thus may be a relatively good indicator that the received data in the DPDCH may not decode correctly.

According to at least some example embodiments, the TTI may be a minimum TTI or any other TTI length.

Example embodiments provide methods and apparatuses for improving TFCI related processing, such as, TFCI detection performance without transmit power increases. In at least one example embodiment, TFCIs for radio frames within the same TTI are combined to provide a more robust detection. In at least one other example embodiment, TFCI errors are detected earlier than in the conventional art so the receiver may terminate transport channel processing to reduce power consumption.

Although some example embodiments have been discussed separately herein, example embodiments may be used in conjunction with one another. For example, the check and decision block 714 of FIG. 6 may be included in the receiver 600 of FIG. 5, and/or aspects described as unique to the receiver 600 of FIG. 5 may be included in the receiver 700 of FIG. 7.

The invention being thus described, it will be obvious that the same may be varied in many ways. Such variations are not to be regarded as a departure from the invention, and all such modifications are intended to be included within the scope of the invention.

We claim:

1. A method for receiving transmitted data at a receiver in a wireless network, the method comprising:
    processing, at the receiver, a first radio frame to recover transmitted data based on transport format information, the transport format information being a combination of individual transport format information associated with sequential radio frames received during a first time interval.

2. The method of claim 1, further comprising:
    generating a control frame associated with each of the sequentially received radio frames, each control frame including an estimate of the individual transport format information associated with a corresponding one the sequentially received radio frames;
    combining the generated control frames to generate a resultant control frame; and
    decoding the resultant control frame to generate the transport format information.

3. The method of claim 2, further comprising:
    buffering the generated control frames for the first time interval; and wherein
    the combining step combines the plurality of buffered control frames after the first time interval.

4. The method of claim 2, wherein the processing step further comprises:
    generating a first data frame based on the first radio frame, the first data frame including an estimate of at least a portion of the transmitted data; and
    decoding the first data frame based on the transport format information to recover the transmitted data.

5. The method of claim 1, wherein the first time interval is a given transmission time interval for transmission between a transmitter and the receiver, and the sequential radio frames constitute the transmission time interval.

6. The method of claim 5, wherein the transmission time interval is a minimum transmission time interval.

7. The method of claim 1, wherein the processing step further comprises:
    generating a first data frame based on the first radio frame, the first data frame including an estimate of at least a portion of the transmitted data; and
    decoding the first data frame based on the transport format information to recover the transmitted data.

8. The method of claim 1, wherein the transport format information is a transport format combination indicator associated with the radio frame.

9. A receiver for receiving transmitted data in a wireless network, the receiver comprising:
    a processing unit configured to process a first radio frame to recover transmitted data based on transport format information, the transport format information being a combination of individual transport format information associated with sequentially received radio frames.

10. The receiver of claim 9, wherein the processing unit further comprises:
    a control frame generating unit configured to generate a control frame associated with each of the sequentially received radio frames within a first time interval, each control frame including an estimate of the individual transport format information associated with a corresponding one the sequentially received radio frames;
    a combining unit configured to combine the plurality of control frames to generate a resultant control frame; and
    a decoding unit configured to decode the resultant control frame to generate the transport format information.

11. A method for power reduction at a receiver in a wireless network, the method comprising:
    determining whether first transport format information associated with a first radio frame is different from second transport format information associated with a second radio frame, the first radio frame being received prior to the second radio frame and the first and the second radio frames being sequential radio frames, and the first and second transport format information being indicative of a transport format for transport channel data received in the first and second radio frames, respectively; and
    selectively processing the transport channel data based on the determining step, such that of processing the transport channel data is disabled if the determining step determines that the first transport format information and the second transport format information are different.

12. The method of claim 11, wherein the disabling step disables processing of the transport channel data associated with at least one of the first and second radio frames only if the determined difference between the first transport format information and the second transport format information indicates a change in transport format for the transport channel data associated with the second radio frame.

13. The method of claim 11, wherein the determining step further comprises:
comparing the first transport format information with the second transport format information; and wherein
the selectively processing step disables processing of the transport channel data associated with at least one of the first and second radio frames if the comparing step indicates that the first transport format information is different from the second transport format information.

14. The method of claim 11, wherein the selectively processing step processes the transport channel data based on the second transport format information if determining step determines the first transport format information and the second transport format information are the same.

15. The method of claim 11, further comprising:
storing the second transport format information if the determining step determines that the first transport format information and the second transport format information are the same; and
selectively processing transport channel data based on the second transport format information.

16. The method of claim 11, further comprising:
processing the first radio frame to generate a first control frame and the second radio frame to generate a second control frame, the first control frame including an estimate of the transport format information associated with the first radio frame, and the second control frame including an estimate of the transport format information associated with the second radio frame; and
decoding the first and second control frames to generate the first and second transport format information.

17. The method of claim 11, wherein the first transport format information and the second transport format information are transport format combination indicators associated with the first radio frame and the second radio frame, respectively.

18. A receiver for receiving transmitted data in a wireless network, the receiver comprising:
a transport format decision unit configured to determine whether first transport format information associated with a first radio frame is different from second transport format information associated with a second radio frame, the first radio frame being received prior to the second radio frame and the first and the second radio frames being sequential radio frames, and the first and second transport format information being indicative of a transport format for transport channel data received in the first and second radio frames, respectively; wherein
the receiver selectively processes the transport channel data based on the determination made by the transport format decision unit, such that processing of the transport channel data is disabled if the transport format decision unit determines that the first transport format information and the second transport format information are different.

19. A method for receiving transmitted data at a receiver in a wireless network, the method comprising:
selectively processing, at the receiver, transport format information at a radio frame to recover transmitted data based on previously processed transport information associated with each of a plurality of radio frames during a first time interval.

* * * * *